(12) United States Patent
Allys et al.

(10) Patent No.: US 7,480,645 B2
(45) Date of Patent: Jan. 20, 2009

(54) METHOD FOR ESTIMATING THE RELEVANCE OF A DOCUMENT WITH RESPECT TO A CONCEPT

(75) Inventors: Guillaume Allys, Royere de Vassiviere (FR); Luc De Bois, Courbevoie (FR); Stephane Martin, Paris (FR); Dominique Kirsner, Nogent sue Marne (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/565,707

(22) PCT Filed: Jul. 21, 2004

(86) PCT No.: PCT/FR2004/001930

§ 371 (c)(1),
(2), (4) Date: Jun. 12, 2006

(87) PCT Pub. No.: WO2005/010774

PCT Pub. Date: Feb. 3, 2005

(65) Prior Publication Data

US 2006/0265367 A1    Nov. 23, 2006

(30) Foreign Application Priority Data

Jul. 23, 2003    (FR) ................... 03 08997

(51) Int. Cl.
*G06F 17/30* (2006.01)
(52) U.S. Cl. ................ 707/3; 707/4; 707/5; 707/102; 707/104.1
(58) Field of Classification Search ............ 707/3, 707/5, 102, 104.1
See application file for complete search history.

(56) References Cited

U.S. PATENT DOCUMENTS 6,502,081 B1 *  12/2002  Wiltshire et al. ............. 706/12
6,847,960 B1 *   1/2005  Li et al. ......................... 707/3

(Continued)

FOREIGN PATENT DOCUMENTS

EP        0 687 987 A1     12/1995

(Continued)

OTHER PUBLICATIONS

Kilgarriff, Adam; "What Is Word Sense Disambiguation Good For?"; Information Technology Research Institute Technical Report Series; Dec. 1997; ITRI-97-08.

(Continued)

*Primary Examiner*—Sana Al-Hashemi
(74) *Attorney, Agent, or Firm*—Robert L. Epstein; Epstein Drangel Bazerman & James, LLP

(57) ABSTRACT

The method of estimating the relevance of a document with respect to a concept comprises calculating (32) a relevance function of the concept with respect to said document on the basis of a known predetermined semantic neighborhood of the concept. It further comprises calculating an ambiguity function of said concept in said document, which ambiguity function is different from the relevance function, said calculation being an estimation based on the presence in the document of different meanings of the concept. The method follows on from a preliminary step of detecting ambiguous concepts in a database.

11 Claims, 2 Drawing Sheets

U.S. PATENT DOCUMENTS

| | | |
|---|---|---|
| 6,996,575 B2 * | 2/2006 | Cox et al. .................... 707/102 |
| 7,013,308 B1 * | 3/2006 | Tunstall-Pedoe ......... 707/104.1 |
| 7,051,022 B1 * | 5/2006 | Faisal ............................. 707/5 |
| 7,085,778 B2 * | 8/2006 | Reed et al. ............... 707/104.1 |
| 7,251,648 B2 * | 7/2007 | Chaudhuri et al. ............. 707/3 |
| 2003/0225749 A1 * | 12/2003 | Cox et al. ....................... 707/3 |
| 2004/0024739 A1 * | 2/2004 | Copperman et al. ............ 707/1 |

FOREIGN PATENT DOCUMENTS

| | | |
|---|---|---|
| EP | 1 267 274 A2 | 12/2002 |
| WO | WO 02/10985 A2 | 2/2002 |

OTHER PUBLICATIONS

Ide, Nanacy & Veronis, Jean; "Introduction To The Special Issue On Word Sense Disambiguation: The State Of The Art"; Computational Linguistics, vol. 24, No. 1; (1998).

* cited by examiner

METHOD FOR ESTIMATING THE RELEVANCE OF A DOCUMENT WITH RESPECT TO A CONCEPT

The present invention relates to a method of estimating the relevance of a document with respect to a concept.

A standard method of estimating the relevance of a document with respect to a concept comprises calculating a relevance function of the concept with respect to that document on the basis of a known predetermined semantic neighborhood of that concept.

The semantic neighborhood of a concept is a set of concepts in a knowledge base that are related to that concept by different semantic links.

As a general rule, when the relevance function of a document with respect to a concept is calculated, the estimation of the calculated function takes account of the presence in the document of the concept itself and of all the concepts belonging to its semantic neighborhood.

Consequently, the result of a request for estimation of the relevance of a document with respect to a concept may be erroneous if that concept is ambiguous, i.e. if it has different meanings. In this case, the semantic neighborhood of the concept includes neighbor concepts with meanings different from that of the concept itself.

This ambiguity is sometimes taken into account in calculating the relevance function by reducing the results obtained by estimating the presence of the concept with one predetermined meaning thereof by a result obtained by estimating the presence of concepts with a different meaning. For example, a document in which the presence of concepts with a different meaning is greater than the presence of concepts with the predetermined meaning is no longer considered to be relevant with respect to the concept.

This type of method taking account of the ambiguity of the concept therefore entails the risk of considering a document that might be of interest to the user as of little relevance with respect to that concept, for example in the event of erroneous detection of ambiguity.

An object of the invention is to eliminate these drawbacks by providing a method of estimating the relevance of a document with respect to a concept that is capable of taking the ambiguity of the concept into account without degrading the estimate of the relevance of the document with respect to the concept.

To this end, the invention consists in a method of estimating the relevance of a document with respect to a concept, the method comprising calculating a relevance function of the concept with respect to said document on the basis of a known predetermined semantic neighborhood of the concept, and characterized in that it further comprises calculating an ambiguity function of said concept in said document, which ambiguity function is different from the relevance function, said calculation being an estimation based on the presence in the document of different meanings of the concept.

Accordingly, taking account of ambiguity is decorrelated from calculating the relevance function. The relevance of the document therefore remains unchanged in the event of ambiguity and it is a score determining only the ambiguity that alerts the user to the fact that the document may or may not be of interest.

In the case of false detection of ambiguity, the document is still considered to be relevant with respect to the concept, since only the score determining the ambiguity is likely to be erroneous.

A method of the invention may further include one or more of the following features:

- the relevance function measures the presence of the concept and of concepts from the semantic neighborhood of that concept in the document;
- the semantic neighborhood of the concept includes a plurality of semantic clouds with different meanings and the ambiguity function compares the presence of concepts belonging to a semantic cloud corresponding to a predetermined meaning of the concept with the presence of concepts belonging to different semantic clouds;
- the presence of each of the concepts belonging to the different semantic clouds is weighted by a predetermined coefficient;
- the method includes a preliminary step of detecting ambiguous concepts, i.e. concepts having a plurality of semantic clouds with different meanings in the same semantic neighborhood;
- during the preliminary detection step, two concepts are considered to be ambiguous if they are linked to each other by at least two different semantic links;
- during the preliminary detection step, a concept is considered to be ambiguous if it is linked to at least two semantic clouds with different meanings;
- the concept belongs to a knowledge base obtained by merging a first knowledge base with a second knowledge base and the preliminary step of detecting ambiguous concepts is executed during merging;
- during the ambiguous concept detection step, a concept from the first knowledge base is considered to be ambiguous if it is linked by a new link to another concept from the first knowledge base;
- during the ambiguous concept detection step, a concept from the first knowledge base is considered to be ambiguous if it is linked to a semantic cloud of the second knowledge base.

Note that a semantic cloud of a particular concept is a set of concepts linked to the same meaning of the concept concerned.

For example, the concept "orange" has in its semantic neighborhood at least two semantic clouds with different meanings, namely a semantic cloud relating to the color orange (including, among others, the concepts of "color", "yellow", "red", etc.) and a semantic cloud relating to the fruit orange (including, among others, the concepts of "fruit", "citrus", "lemon", etc.).

The invention will be better understood on reading the following description, which is given by way of example only and with reference to the appended drawings, in which:

FIG. 1 is a diagram of a knowledge base 10.

Figure 1:
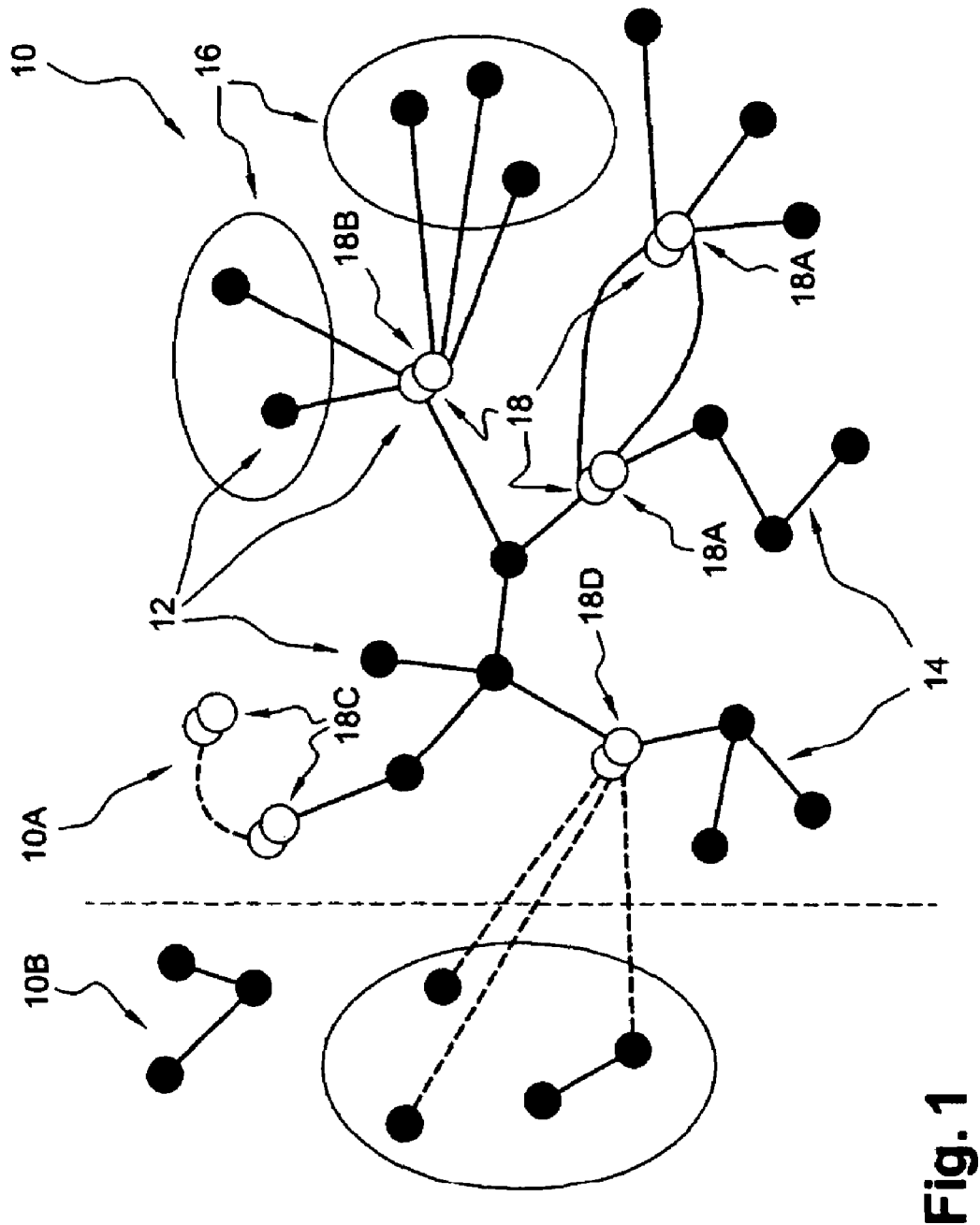
FIG. 1 is a diagram of a knowledge base consisting of concepts and semantic links between them.

In this example, the knowledge base 10 consists of a knowledge base 10A to which a knowledge base 10A has been added using a knowledge base merging method known to the person skilled in the art.

A concept 12 from the knowledge base 10 is linked to other concepts by semantic links 14.

The set of concepts linked in this way to the concept 12 constitutes a semantic neighborhood of that concept 12 that may include semantic clouds 16 with different meanings, a semantic cloud 16 from the neighborhood of the concept 12 being a set of concepts related to the same meaning of the concept 12 concerned (see above).

A concept 12 linked to a plurality of semantic clouds 16 with different meanings is said to be "ambiguous". Ambiguous concepts are designated in FIG. 1 by the general reference 18 and by the particular references 18A, 18B and 18C corresponding to different ways of detecting ambiguous concepts as used during a preliminary step of analyzing the knowledge base 10 and described in detail with reference to FIGS. 2 and 3.

During this preliminary step, concepts having semantic clouds with different meanings in their semantic neighborhood are marked as being ambiguous.

Figure 2:
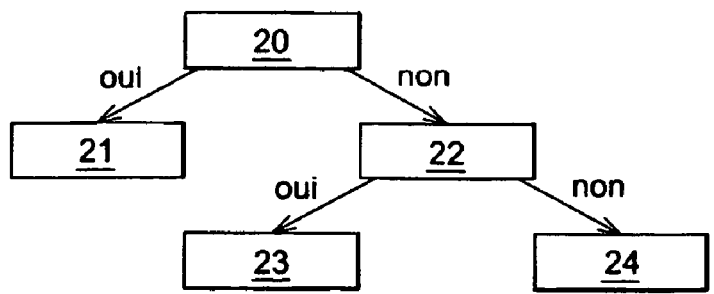
FIGS. 2 and 3 represent diagrammatically a method of detecting ambiguous concepts used in a method of the invention.

FIG. 2 represents one implementation of this preliminary step, adapted to detect ambiguous concepts in a given knowledge base, for example the knowledge base 10A here.

Each concept 12 in the knowledge base 10A is analyzed during a step 20 that searches for at least two different semantic links that link the concept 12 to only one other concept.

If such links exist, the next step is a step 21 during which the concept is marked as being an ambiguous concept 18A, since the presence of two or more links to the same other concept indicates a high probability of those links relating to different meanings of the concept.

Otherwise, the next step is a step 22 that searches for at least two semantic links that link the concept 12 to two semantic clouds with different meanings.

If such links exist, the concept is ambiguous by definition. The next step is then a step 23 during which the concept is marked as an ambiguous concept 18B.

Otherwise, the concept 12 is not considered to be ambiguous and the next step is a step 24 terminating the preliminary step of analyzing the knowledge base 10A.

Figure 3:
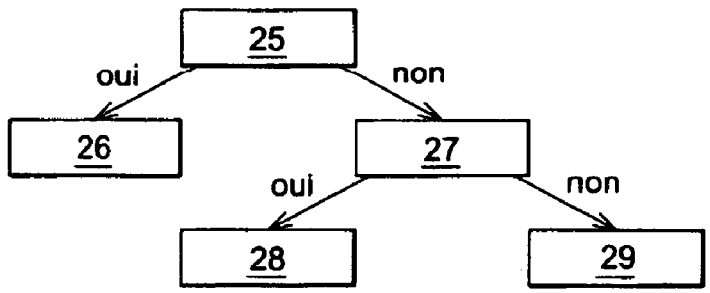

FIG. 3 represents one implementation of the preliminary step of detecting ambiguous concepts, more particularly when merging the knowledge base 10A with the knowledge base 10B. New links between concepts created during merging are represented in dashed line in the figure.

Each concept 12 in the knowledge base 10A is analyzed during a step 25 which searches for a new semantic link that links the concept 12 to another concept in the knowledge base 10A and was created when merging the two bases 10A and 10B.

If there is a new link of the above kind, the next step is a step 26 during which the concept is marked as an ambiguous concept 18C, since the relationship between the two concepts does not exist in the original knowledge base 10A, which implies potential homonyms.

Otherwise, the next step is a step 27 which analyses each concept 12 in the knowledge base 10A again, searching for a semantic link that links the concept 12 to a cloud of new concepts of the knowledge base 10B.

If there is a link of that kind, the next step is a step 28 during which the concept is marked as an ambiguous concept 18D, since it is probable that the link to the new concepts relates to a homonym.

Otherwise, the concept 12 is not considered to be ambiguous and the next step is a step 29 terminating the preliminary step of analyzing the knowledge base.

Figure 4:
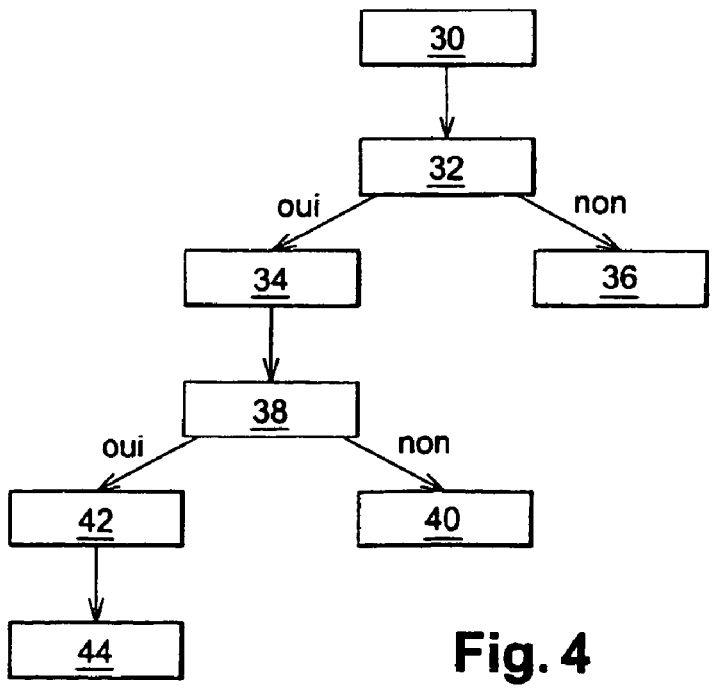
FIG. 4 is a diagram of a method of the invention for estimating the relevance of a document with respect to a concept.

Once this preliminary step of searching for ambiguous concepts has been effected, it is possible to estimate the relevance of a document with respect to a given concept of the knowledge base 10 using the method represented diagrammatically in FIG. 4.

In a first step 30, a request for estimation of the relevance of a document with respect to a concept 12 from the knowledge base 10 is sent, for example by a search engine.

Once that request has been sent, the next step is a step 32 during which a function of the relevance of the document with respect to the concept 12 is calculated in a manner that is known to the person skilled in the art. The relevance function is calculated taking account of the presence in the document of the concept 12 and of concepts from the semantic neighborhood of the concept 12.

Accordingly, the relevance function is given by the following equation, for example:

$$\text{Relevance}(Doc, 12) = f[\text{Presence}(Doc, 12) \cdot \text{coeff} \times \text{Presence}(Doc, \text{nhood}(12))],$$

in which:

Relevance(Doc, 12) is the relevance function of the concept 12 in the document considered;

Presence(Doc, 12) is a function quantifying the presence of the concept 12 in the document concerned, for example the number of times that the concept 12 appears in the document;

Presence (Doc,nhood(12)) is a function quantifying the presence in the document concerned of concepts from the neighborhood of the concept 12;

coeff is a predetermined weighting coefficient for assigning more or less importance to the concepts belonging to the semantic neighborhood of the concept 12; and f is, for example, a "maximum" function, or a "sum" function.

As a function of the above calculation, the document may be considered to be relevant with respect to the concept 12 if the calculation gives a result above a predetermined threshold, for example. In this case, the next step is a step 34 which marks the document as relevant with respect to the concept 12.

Otherwise, if the calculation yields a result below the predetermined threshold, the next step is a step 36 during which the document is marked as not being relevant with respect to the concept 12. In this case, the irrelevant document is not retained.

If the document is marked as being relevant, the method of the invention then calculates an ambiguity function in respect of the concept in the document.

A step 38 verifies whether the concept 12 to which the request relates is marked as ambiguous in the knowledge base 10.

If it is not marked as ambiguous, the next step is a step 40 which marks the document as relevant and not ambiguous.

If the concept 12 is marked as ambiguous, the next step is a step 42 which calculates the ambiguity function by comparing the presence of concepts belonging to a semantic cloud corresponding to a particular meaning of the concept 12 (the meaning of the concept in the request) with the presence of concepts belonging to different semantic clouds.

Accordingly, the ambiguity function may be given by the following equation:

$$\text{Ambiguity}(Doc, 12) = f[\text{coeff1} \times \text{Presence}(Doc, \text{cloud1}), \text{coeff2} \times \text{Presence}(Doc, \text{cloud2})]$$

in which:

Ambiguity(Doc, 12) is the ambiguity function of the concept 12 in the document concerned;

cloud1 and cloud2 are two different semantic clouds linked to the concept 12 concerned;

Presence(Doc, cloud 1) quantifies the presence of concepts belonging to cloud1 in the document concerned;

coeff1 is a predetermined coefficient for assigning more or less importance to the concepts belonging to the cloud1;

Presence(Doc, cloud2) quantifies the presence of concepts belonging to cloud2 in the document concerned;

coeff2 is a predetermined coefficient for assigning more or less importance to the concepts belonging to cloud 2; and f is a comparison function.

When this ambiguity score has been calculated, the next step is a step 44 during which the document is marked as relevant with an ambiguity score, and it therefore remains only for the user to estimate whether the document is liable to be of interest or not, on the basis of the ambiguity score.

It is clear that a method as described above for estimating the relevance of a document with respect to a given concept produces better results than the prior art methods by weighting the relevance by means of an ambiguity calculation without affecting the estimation of the relevance itself.

The invention claimed is:

1. A method of estimating a relevance of a document with respect to a concept comprising:

calculating a relevance function of the concept with respect to said document based upon a known predetermined set of concepts in a knowledge base that are related to that concept by different semantic links, said set of concepts being called a semantic neighborhood of the concept, determining whether said document is relevant with respect to the concept and when so determined, calculating an ambiguity function of said concept in said document, which ambiguity function is different from the relevance function, estimation related to by estimating the presence of different meanings of the concept in the document, and marking the document considered to be relevant with a result of the calculation of the ambiguity function.

2. A method according to claim 1 of estimating the relevance of a document with respect to a concept, wherein the relevance function measures a presence, in the document, of the concept and of concepts from the semantic neighborhood of that concept in the document.

3. A method according to claim 1 of estimating the relevance of a document with respect to a concept, wherein, when the semantic neighborhood of the concept includes a plurality of sets of concepts linked to different meanings of the concept concerned, called semantic clouds, the ambiguity function compares the presence of concepts belonging to a semantic cloud corresponding to a predetermined meaning of the concept with the presence of concepts belonging to different semantic clouds.

4. A method according to claim 3 of estimating the relevance of a document with respect to a concept, wherein the presence of each of the concepts belonging to the different semantic clouds is weighted by a predetermined coefficient.

5. A method according to claim 1 of estimating the relevance of a document with respect to a concept, including a preliminary step of detecting ambiguous concepts, i.e. concepts having a plurality of semantic clouds with different meanings in the same semantic neighborhood.

6. A method according to claim 5 of estimating the relevance of a document with respect to a concept, wherein, during the preliminary detection step, two concepts are considered to be ambiguous if they are linked to each other by at least two different semantic links.

7. A method according to claim 5 of estimating the relevance of a document with respect to a concept, wherein, during the preliminary detection step, a concept is considered to be ambiguous if it is linked to at least two semantic clouds with different meanings.

8. A method according to claim 5 of estimating the relevance of a document with respect to a concept, wherein, the concept belonging to a knowledge base obtained by merging a first knowledge base with a second knowledge base, the preliminary step of detecting ambiguous concepts is executed during merging.

9. A method according to claim 8 of estimating the relevance of a document with respect to a concept, wherein, during the ambiguous concept detection step, a concept from the first knowledge base is considered to be ambiguous if it is linked by a new link to another concept from the first knowledge base.

10. A method according to claim 8 of estimating the relevance of a document with respect to a concept, wherein, during the ambiguous concept detection step, a concept from the first knowledge base is considered to be ambiguous if it is linked to a semantic cloud of the second knowledge base.

11. A method of estimating a relevance of a document with respect to a concept comprising:

calculating a relevance function of the concept with respect to said document based upon a known predetermined set of concepts in a knowledge base that are related to that concept by different semantic links, said set of concepts being called a semantic neighborhood of the concept, and, if the document is considered to be relevant with respect to the concept:

calculating an ambiguity function of said concept in said document, which ambiguity function is different from the relevance function, estimation related to by estimating the presence of different meanings of the concept in the document, and marking the document considered to be relevant with a result of the calculation of the ambiguity function and, if the document is not considered to be relevant with respect to the concept:

marking the document as not being relevant.

\* \* \* \* \*